United States Patent
Hjelmström

(10) Patent No.: US 10,687,036 B2
(45) Date of Patent: Jun. 16, 2020

(54) METHOD, APPARATUS AND SYSTEM FOR DETECTING AND REDUCING THE EFFECTS OF COLOR FRINGING IN DIGITAL VIDEO ACQUIRED BY A CAMERA

(71) Applicant: Axis AB, Lund (SE)

(72) Inventor: Jonas Hjelmström, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/167,393

(22) Filed: Oct. 22, 2018

(65) Prior Publication Data
US 2019/0166341 A1 May 30, 2019

(30) Foreign Application Priority Data
Nov. 30, 2017 (EP) .................................. 17204717

(51) Int. Cl.
*H04N 9/64* (2006.01)
*H04N 5/359* (2011.01)
(Continued)

(52) U.S. Cl.
CPC ............ *H04N 9/646* (2013.01); *G06T 5/001* (2013.01); *G06T 5/50* (2013.01); *H04N 5/359* (2013.01);
(Continued)

(58) Field of Classification Search
CPC .... H04N 9/646; H04N 5/3572; H04N 9/0451; H04N 5/367; H04N 5/359; G06T 5/50;
(Continued)

(56) References Cited

U.S. PATENT DOCUMENTS

2001/0030697 A1 10/2001 Dischert et al.
2007/0103567 A1 5/2007 Wloka
(Continued)

FOREIGN PATENT DOCUMENTS

JP 2009284009 A2 12/2009
JP 2011211329 A2 10/2011

OTHER PUBLICATIONS

Detection and Correction of Purple Fringing Using Color Desaturation in the XY Chromaticity Diagram and the Gradient Information, Baek-Kyu Kim and Rae-Hong Park, Elsevier Journal, 2010.

*Primary Examiner* — Timothy J Henn
(74) *Attorney, Agent, or Firm* — Volpe and Koenig, P.C.

(57) ABSTRACT

The disclosure relates to a method, apparatus and system for detecting and reducing the effects of color fringing in digital video acquired by a camera comprising an iris. The method comprises: acquiring, by the camera, a first digital image frame using a first camera setting, including a first iris aperture size; acquiring, by the camera, a second digital image frame using a second camera setting, including a second iris aperture size, wherein the second aperture size is smaller than the first aperture size; comparing the first and the second digital image frame, at least a specific color component thereof; localizing regions having a disproportional intensity ratio in the specific color component between the first digital image frame and the second digital image frame; and reducing the specific color component in the localized regions for subsequently acquired digital image frames.

13 Claims, 5 Drawing Sheets

(51) Int. Cl.
  *H04N 5/367*  (2011.01)
  *H04N 9/04*   (2006.01)
  *H04N 5/357*  (2011.01)
  *G06T 5/00*   (2006.01)
  *G06T 5/50*   (2006.01)

(52) U.S. Cl.
  CPC ........... *H04N 5/3572* (2013.01); *H04N 5/367* (2013.01); *H04N 9/0451* (2018.08); *G06T 2207/10024* (2013.01); *G06T 2207/10141* (2013.01)

(58) Field of Classification Search
  CPC ........... G06T 5/001; G06T 2207/10141; G06T 2207/10024
  See application file for complete search history.

(56) References Cited

U.S. PATENT DOCUMENTS

| | | | |
|---|---|---|---|
| 2009/0273690 A1* | 11/2009 | Nashizawa | H04N 5/3572 348/242 |
| 2010/0080458 A1 | 4/2010 | Yamada et al. | |
| 2011/0298933 A1 | 12/2011 | Yanowitz et al. | |
| 2012/0106841 A1 | 5/2012 | Tzur et al. | |
| 2012/0141027 A1* | 6/2012 | Hatakeyama | H04N 1/58 382/167 |
| 2013/0050544 A1* | 2/2013 | Kano | H04N 9/045 348/242 |
| 2014/0112581 A1 | 4/2014 | James | |
| 2015/0092089 A1* | 4/2015 | Vitsnudel | G06T 5/002 348/242 |
| 2016/0171663 A1 | 6/2016 | Kim et al. | |

\* cited by examiner

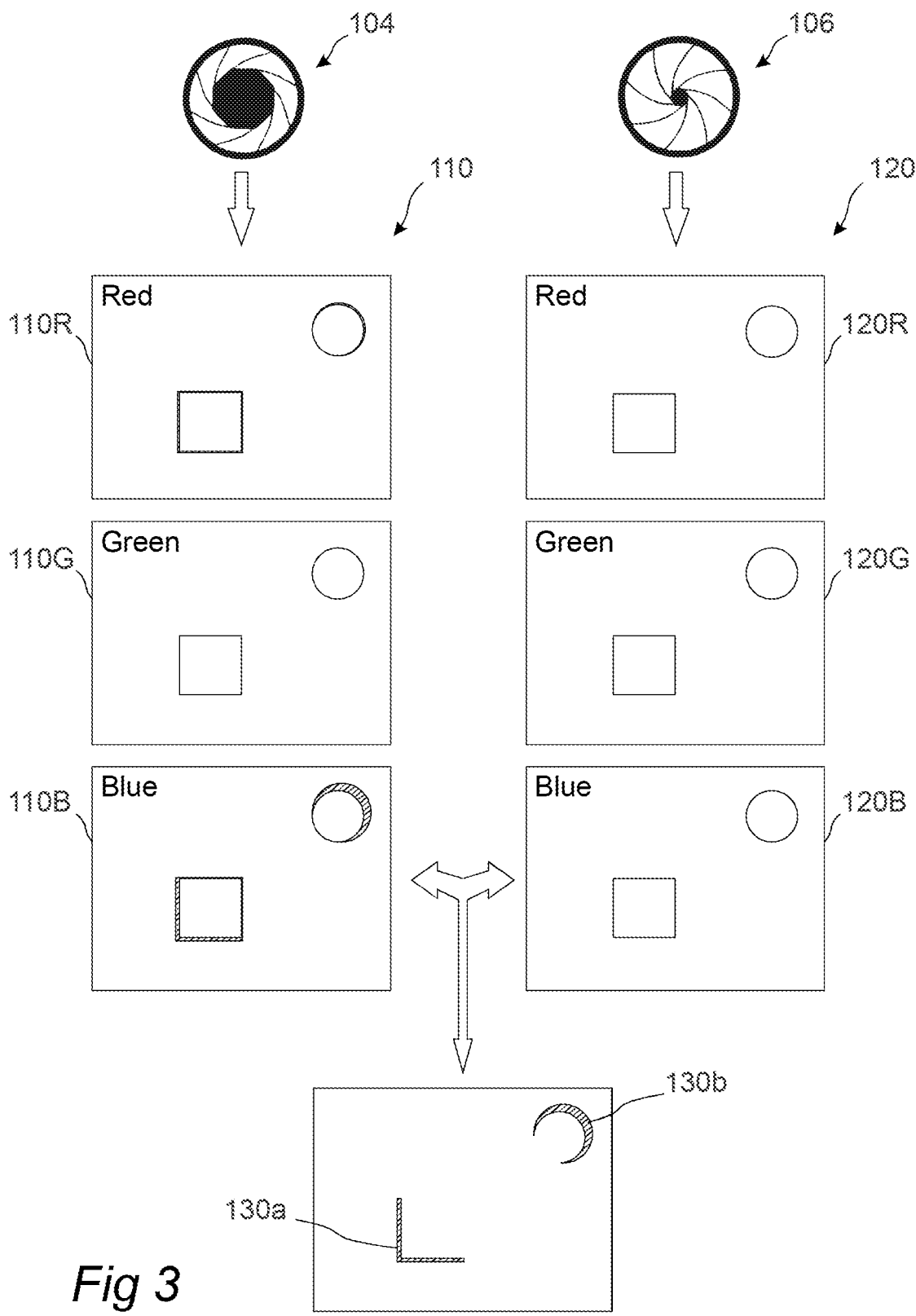

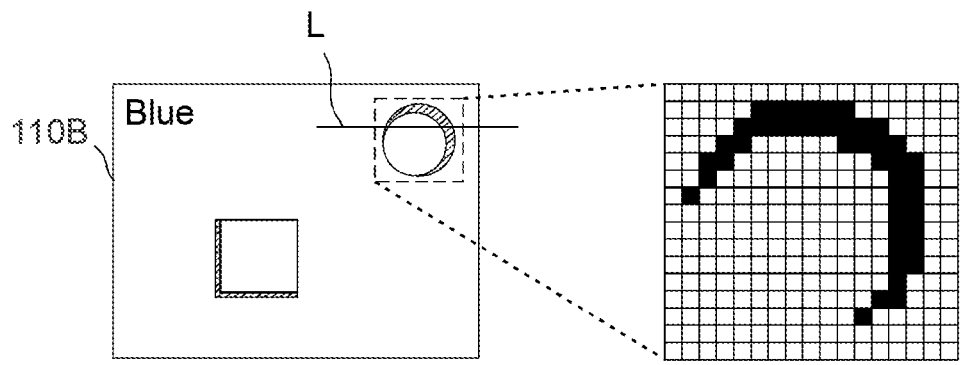
*Fig 4A*
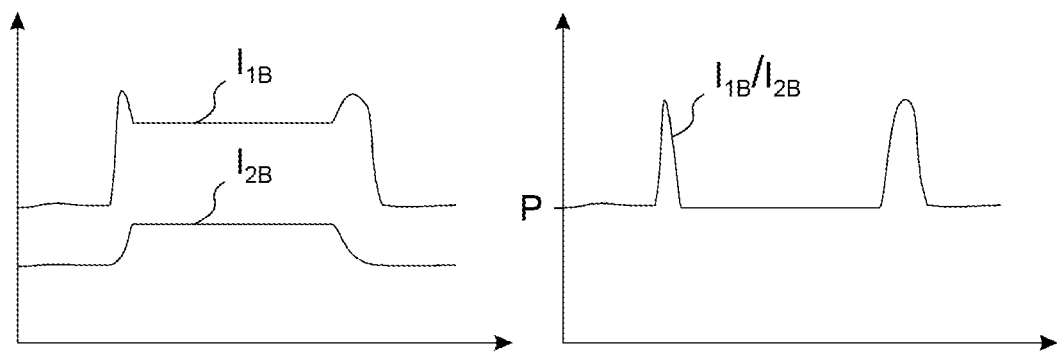
*Fig 4B*  *Fig 4C*
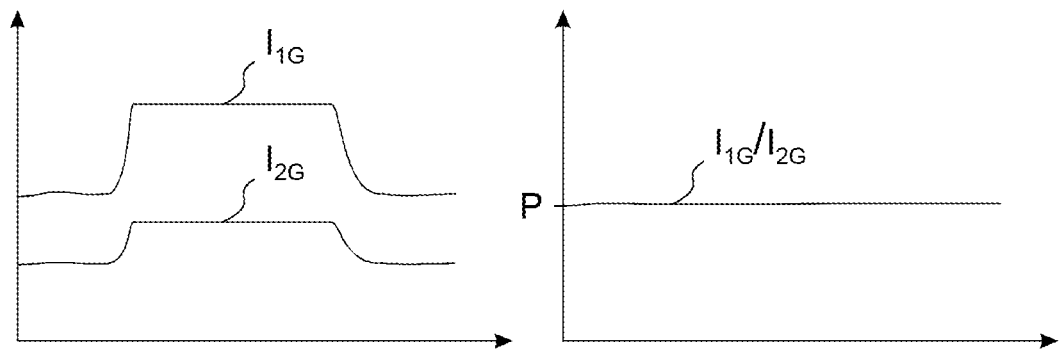
*Fig 4D*  *Fig 4E*

METHOD, APPARATUS AND SYSTEM FOR DETECTING AND REDUCING THE EFFECTS OF COLOR FRINGING IN DIGITAL VIDEO ACQUIRED BY A CAMERA

TECHNICAL FIELD

The present invention relates to a method for detecting and reducing the effects of color fringing in digital video acquired by a camera. The present invention further relates to an apparatus for controlling a camera and reducing the effects of color fringing in digital video acquired by the camera and a system for detecting and reducing the effects of color fringing in digital video acquired by a camera.

BACKGROUND ART

When acquiring digital video with a camera equipped with a lens, various problems may be caused by lens aberration. One such type of lens aberration is chromatic aberration, which is caused by the fact that the refractive index of light with respect to lens material varies due to its wavelength, which typically results in false color at an image capture surface, such as a digital image sensor of the camera. Lens aberration is the major phenomenon responsible for what is often referred to as color fringing. Often, the color fringing is most prominent in the blue/violet wavelength region. Thus, the term purple fringing is often used. Color fringing may, however, occur at any color. Color fringing appears as borders of false color around objects in an acquired digital image frame. The borders often appear around over-exposed areas near the edges of the acquired digital image frame. The problem may be exaggerated when performing digital image processing to enhance visibility of the scene and may therefore be a considerable problem for many applications where post-processing of digital image frames is needed.

Some of the color fringing problem come from longitudinal chromatic aberration in imaging optics of the camera, the longitudinal aberration being a result from blue light being refracted more than green or red light. Thus, blue light, for example, may be focused before the image plane, which results in the blue light being out of focus at the image plane. Some color fringing may also come from lateral chromatic aberration, which results from obliquely incident light being focused to different spatial positions within the image plane. Hence, all colors will be focused to the same plane, but the foci are not placed along the optical axis of the incident light.

There are ways to reduce color fringing due to color aberration, such as using high-quality lenses made from special material, such as fluorite. However, since high cost is required to manufacture such lenses, the price may be too high for many applications. Another way to reduce color fringing is to analyze and post-process the digital image frames. Several methodologies exist to minimize color fringing in existing digital image frames by means of post-processing. However, this is not a trivial problem as it is not readily apparent which regions in a digital image frame that suffer from the problem. One approach is to correct for color fringing at areas which are likely to suffer from it. One typical example where color fringing occurs is close to an over-exposed area in the periphery of a digital image frame. As color fringing often is purple, an approach may be to correct for purple fringing at borders of over-exposed areas of a digital image frame. This approach may work in some cases, but there are also cases where the approach may lead to inappropriate action. A reason is that not all pixels close to over-exposed areas are suffering from color fringing. One example of such a situation is a cumulus cloud on a blue sky. The cumulus cloud may appear to be an over-saturated area and, consequently, an image analysis may falsely interpret the blue sky at the border between the sky and the cloud as regions suffering from color fringing. There is thus a need in the art for an improved method for detecting and reducing the effects of color fringing in digital video.

SUMMARY

Mitigating, alleviating or eliminating one or more of the above-identified deficiencies in the art and disadvantages singly or in any combination would help to solve at least the above mentioned problem.

According to a first aspect there is provided a method for detecting and reducing the effects of color fringing in digital video acquired by a camera comprising an iris, said digital video comprising a sequence of acquired digital image frames, said method comprising:

acquiring, by the camera, a first digital image frame using a first camera setting, including a first iris aperture size;

acquiring, by the camera, a second digital image frame using a second camera setting, including a second iris aperture size;

wherein the second aperture size is smaller than the first aperture size;

comparing the first and the second digital image frame, at least a specific color component thereof;

localizing regions having a disproportional intensity ratio in the specific color component between the first digital image frame and the second digital image frame; and reducing the specific color component in the localized regions for subsequently acquired digital image frames.

The term "iris" should be construed as an optical device having an aperture which size may be adjusted. An iris is also referred to as an iris diaphragm.

The term "color component" of a digital image frame should be construed as a portion of the image information pertaining to a specific color, such as e.g. purple, blue, green and red, present in the digital image frame. It is emphasized that the term "color" should be construed broadly. Thus, the term color is not limited to a specific wavelength, nor a specific range of wavelengths, in the electromagnetic spectrum. Instead, the term color may be a mix of wavelengths covering an area in a color space representation. The color component may be defined for each pixel within the digital image frame. The color component may be the digital data of a color channel of an RGB-coded digital image frame. Thus a blue color component could correspond to the portion of the image information stored within the blue channel. Alternatively, or additionally, the color component may comprise data from more than one channel. For example, a blue color component could be a specific blue, or at least bluish, area within an RGB color space of the digital image frame.

The term "exposure" is often defined as the amount of light per unit area, i.e. the image plane illuminance times the exposure time, reaching the digital image sensor of the camera, as determined by shutter speed, lens aperture and scene luminance. However, in the context of the present disclosure, the term "exposure" is broadened to encompass also the gain of the digital image sensor, in digital photography often referred to using the ISO number. Thus, the exposure may be changed by adjusting the iris aperture size, the shutter speed and the ISO number.

As readily realized by the person skilled in the art, the order in time of acquiring the first and second digital image frame is not of importance. Thus, either the first digital image frame or the second digital image frame may be acquired first. The subsequently acquired digital image frames will be selectively post-processed using the information derived from comparing the first and second digital image pair.

The method may be advantageous as it allows for determining in which regions of a digital image frame the color fringing occurs without solely having to rely on image analysis. By comparing two digital image frames acquired using different camera settings, including different iris aperture sizes, the degree of color fringing present in the two images will be expected to differ. This has its origin in the fact that longitudinal chromatic aberration, which is responsible for at least parts of the color fringing phenomenon, can be reduced by closing the iris. In a case where only the iris aperture size is adjusted and the rest of the parameters of the camera setting is kept constant, the closing of the iris will reduce the incoming light to the digital image sensor, thus rendering the digital image frame darker. Thus, returning to the example of the blue sky and the cloud, the "true" blue regions in a digital image frame (e.g. the blue sky) will also become darker. However, if blue regions are present which originates from longitudinal chromatic aberration, these blue regions will become even darker than the "true" blue regions. This is a result of the closing iris affecting not only the general illumination of the digital image sensor but also the reduction of longitudinal chromatic aberration. By comparing the two digital image frames it is thus possible to separate "true" blue regions from regions suffering from color fringing, and thereby also making it possible to reduce the color fringing of a digital image frame by selectively post-processing the digital image frame in the localized regions. Specifically, the present concept allows for post-processing a series of subsequently acquired digital image frames in the localized regions. This may be of special importance for digital video, such as a digital video stream from a surveillance camera. By allowing the camera to acquire a pair of digital image frames using a different iris aperture size for each digital image frame of the pair, the pair of digital image frames may be analyzed to localize the regions of color fringing. Subsequently acquired digital image frames may then be post-processed with image post processing algorithms using the coordinates defining the localized regions as input. The post-processing will be simplified as the localizing step is not needed, whereby the speed of the post-processing step may be increased. Furthermore, the localizing step obtained is suffering less from artifacts in the digital image frames as compared to a localizing step purely based upon image analysis of a single digital image frame. The method may be especially useful for reducing color fringing in a digital video depicting a substantially stationary scene. However, the method may apply also for a scene having moving objects.

When the iris aperture size is varied, the image exposure changes with it. Hence, there will be a change in image intensity between the first and second image. The regions of a digital image frame suffering from a longitudinal chromatic aberration will, due to the reduced iris aperture, result in a more prominent change in intensity when comparing the first and second digital image frame than the change in intensity found in other regions of the digital image frame not suffering from longitudinal chromatic aberration. This implies that the disproportional intensity ratio will always be larger than a reference intensity ratio. The reference intensity ratio may be regarded as an expected ratio in intensity due to the decreased iris aperture size. In practical situations, the reference intensity ratio must be estimated. One way to estimate the reference intensity ratio is to calculate the ratio in average intensity between the first and second image. In other words, the disproportional intensity ratio in the blue color component of the localized regions may be larger than a ratio in average intensity between the first digital image frame and the second digital image frame. Another way to estimate the reference intensity ratio is to calculate the ratio in intensity in a green channel between the first and second image. The reference intensity ratio must not be calculated from the first and second digital image frames. Instead, the reference intensity ratio may be a predetermined value determined from knowledge of the optics and the first and second aperture size.

According to some embodiments, the disproportional intensity ratio in the specific color component of the localized regions is larger than a ratio in average intensity between the first digital image frame and the second digital image frame. To reduce noise, a threshold may be used. Thus, according to some embodiments, the disproportional intensity ratio in the specific color component of the localized regions is larger than a sum of a threshold value and a ratio in average intensity between the first digital image frame and the second digital image frame.

According to some embodiments, the acquired digital image frames of the sequence of acquired digital image frames are RGB digital image frames comprising a red, green and blue channel.

According to some embodiments, the specific color component is reduced by, for pixels present within the localized regions, replacing existing intensity levels of the red, green and blue channel of each of the subsequently acquired digital image frames to new intensity levels being equal to each other. This approach may provide a simple and fast reduction of color fringing which may be applicable also on systems having less computing power. The new intensity levels may be derived by taking the arithmetic mean of the intensity levels for the red, green and blue channels, respectively.

According to some embodiments, the specific color component is reduced by, for pixels present within the localized regions, replacing existing intensity levels of each of the subsequently acquired digital image frames with new intensity levels based upon intensity levels of neighboring pixels. This approach may provide an improved digital video for some applications.

According to some embodiments, the second camera setting relates to the first camera setting such that the second digital image frame obtains the same exposure as the first digital image frame. This implies that said camera settings may comprise more parameters than the iris aperture size. Specifically, the camera settings further comprise the exposure time (such as for example the shutter speed) and the ISO number pertaining to the gain of the digital image sensor. Thus, the same exposure may be obtained using different camera settings. For example, the first camera setting having the larger aperture size may have a shorter exposure time than the second camera setting having the smaller iris aperture size.

According to some embodiments, the subsequently acquired digital image frames are acquired using the first camera setting. Alternatively, the subsequently acquired digital image frames are acquired using a further camera setting, including the first iris aperture size.

According to some embodiments, the specific color component is reduced by, for pixels present within the localized regions, replacing existing intensity levels of each of the subsequently acquired digital image frames with the intensity levels of the second digital image frame. This approach may work in many situations, since the reduction of the iris aperture size in many practical situations have been found to reduce the level of color fringing to a high degree. The approach is based upon the first and second digital image frames having been acquired such that they obtain the same exposure. However, replacing image data from the second digital image frame into the subsequently acquired digital image frames may also be realized in a situation where the first and second digital image have obtained different exposures. In such a case, the image data collected from the localized regions of the second digital image frame will have to be adjusted for the difference in exposure before being entered to replace existing intensity levels of the subsequently acquired digital image frames.

According to some embodiments, the specific color component is a blue-color component. This implies that the color component pertains to a portion of the image information pertaining to a blue or "bluish" color, such as for example the portion of the image information stored within the blue channel of an RGB-coded digital image.

According to some embodiments, the blue-color component is reduced by, for pixels present within the localized regions, replacing existing intensity levels of the blue channel of each of the subsequently acquired digital image frames to new intensity levels being a predetermined fraction of the existing intensity levels. This approach may provide a simple and fast reduction of blue fringing which may be applicable also on systems having less computing power. The proposed method may alternatively be applied for a green color component, thus involving a replacement of existing intensity levels of the green channel, or a red color component, involving a replacement of existing intensity levels of the red channel.

According to some embodiments, the step of reducing the specific color component in the localized regions is carried out during a predetermined time period. Alternatively, the step of reducing the specific color component in the localized regions is carried out for a predetermined number of subsequently acquired digital image frames. Independent on which of the approaches are used, this implies that the method may be initiated consecutively. For example, the method may be initiated at the end of a predetermined time period. Thus, a new pair of first and second digital image frames may be acquired each 5 minutes. The time period may depend on the scene imaged by the camera as a dynamic scene will increase the need for applying the method at shorter time intervals than a substantially static scene.

According to some embodiments, the sequence of acquired digital image frames comprises the first digital image frame, the second digital image frame and the subsequently acquired digital image frames. This implies that no acquired image is omitted from the video. This may ensure keeping the frame rate constant thus allowing for a smooth digital video. The sequence of digital image frames of the digital video may comprise: the first digital image frame, the second digital image frame, and the subsequently acquired digital images frames in a time sequence. Furthermore, as the process may be repeated, a new pair of first and second digital image frames followed by a new set of subsequently acquired digital image frames may be added thereafter and so on.

According to a second aspect there is provided a computer-readable medium comprising computer code instructions which when executed by a device having processing capability are adapted to perform the method according to the first aspect.

According to a third aspect there is provided an apparatus for controlling a camera and reducing the effects of color fringing in digital video acquired by the camera, said digital video comprising a sequence of acquired digital image frames, the apparatus being configured to:

communicate, to the camera, instructions pertaining to the camera acquiring a first digital image frame using a first camera setting, including a first iris aperture size;

communicate, to the camera, instructions pertaining to the camera acquiring a second digital image frame using a second camera setting, including a second iris aperture size, wherein the second aperture size is smaller than the first aperture size;

compare the first and the second digital image frame, at least a specific color component thereof;

localize regions having a disproportional ratio in the specific color component between the first digital image frame and the second digital image frame; and reduce the specific color component in the localized regions for subsequently acquired digital image frames.

According to a fourth aspect there is provided a system for detecting and reducing the effects of color fringing in digital video acquired by a camera, said system comprising:

a camera configured to acquire a digital video comprising a sequence of acquired digital image frames, wherein said camera comprises an iris;

an apparatus according to the third aspect.

The camera may be a surveillance camera suitable for mounting on a supporting structure such as a wall or a ceiling. The system may, at least in part, be included in the camera housing such that at least parts of the method steps carried out by the system is carried out within the surveillance camera.

Effects and features of the second, third and fourth aspects are largely analogous to those described above in connection with the first aspect. Embodiments mentioned in relation to the first aspect are largely compatible with the second, third and fourth aspects. It is further noted that the concepts relate to all possible combinations of features unless explicitly stated otherwise.

A further scope of applicability will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that the teachings herein are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

Examples are described in more detail with reference to the appended drawings, which shows presently preferred embodiments.

FIG. 3 shows a schematic view of three color channels of a first and second digital image frame, respectively, according to embodiments of the disclosure. FIG. 3 also shows the localized regions extractable from the first and second digital image frame.

FIG. 4A shows the blue channel of the first digital image frame from FIG. 3, highlighting a portion of the digital image frame having a localized region of color fringing.

FIG. 4B shows intensity profiles obtained from the blue channels of the first and second digital image frames, respectively. The intensity profiles have been obtained along a line L, as defined in FIG. 4A.

FIG. 4C shows the ratio between the two intensity profiles of FIG. 4B.

FIG. 4D shows intensity profiles obtained from the green channels of the first and second digital image frames, respectively. The intensity profiles have been obtained along a line L, as defined in FIG. 4A.

FIG. 4E shows the ratio between the two intensity profiles of FIG. 4D.

DETAILED DESCRIPTION

Figure 1:
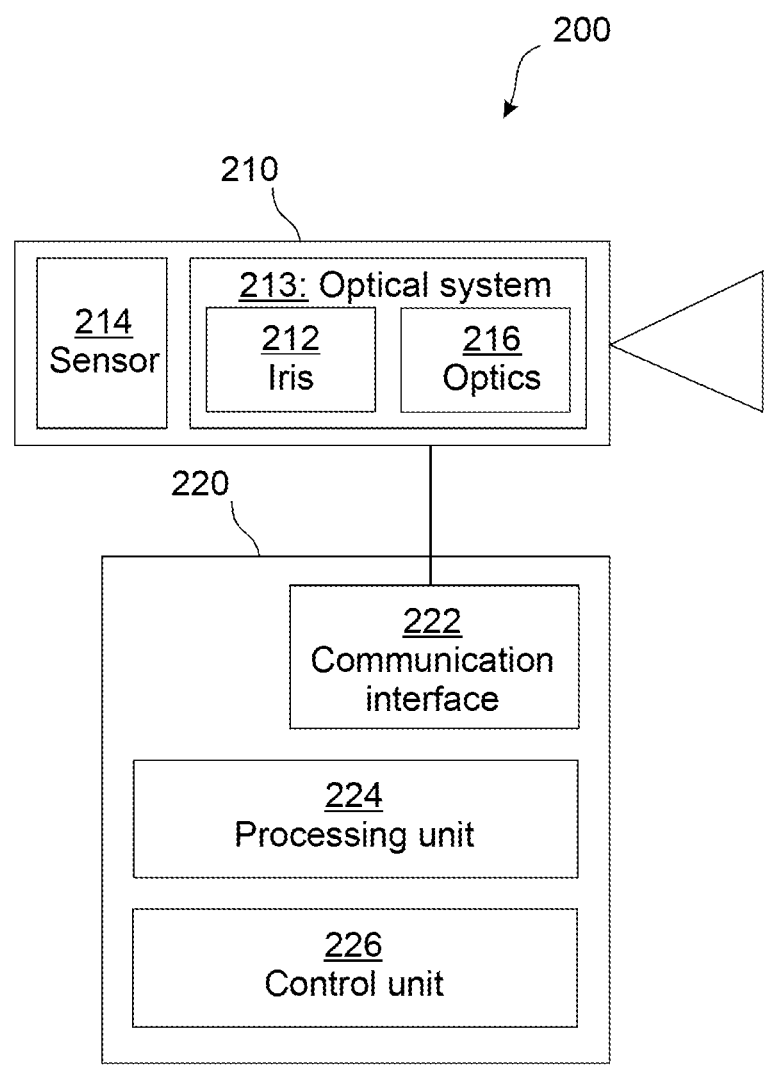
FIG. 1 shows a schematic view of a system according to embodiments of the present disclosure.

The present teachings will now be described more fully hereinafter with reference to the accompanying drawings, in which currently preferred embodiments are shown. However, the teachings may be embodied in many different forms and should not be construed as limited to the embodiments set forth herein; rather, these embodiments are provided for thoroughness and completeness, and fully convey the scope of the claims to the skilled person.

Firstly, a short description of the underlying principles will be provided. These concepts of the disclosure are based upon utilizing the fact that the severity of color fringing in a captured digital image frame depends on the aperture size of the iris in the camera. Larger iris aperture sizes allow more light to enter the camera, but will, at the same time, allow a higher degree of lens aberration. The influence of the aperture size on lens aberration is most pronounced for longitudinal chromatic aberration where the incident light is focused to different positions along the optical axis. By decreasing the lens aperture, rays that have travelled in the peripheral parts of the lens will be blocked to a higher degree than rays that has travelled in the central part of the lens. As the severity of longitudinal chromatic aberration scales with the radial distance from the lens center, the overall effect is that a reduced aperture will decrease the longitudinal chromatic aberration and hence also the effect of color fringing in the captured digital video. Although most prominent for longitudinal chromatic aberration, reducing the aperture has been found to mitigate also other types of image artefacts related to color fringing.

As the aperture of the camera is reduced, the total amount of light that impinges on the digital image sensor of the camera will be reduced. Generally, this is unwanted, as it may risk decreasing the image quality. To compensate, the image exposure time and/or the gain of the digital image sensor may be increased. However, this may not be advisable for all situations. For example, an increased exposure time will lead to reduced time resolution jeopardizing accurate capture of objects in motion. Increasing the gain of the digital image sensor also increases the noise in the captured image, which leads to a generally decreased image quality as well as risks introducing image artifacts.

This is solved this by using a reduced aperture size only at specific moments in time. By analyzing the ratio between the digital image frame acquired using a smaller aperture size with the digital image frame acquired with a larger aperture size just moments later, or before, the regions in which color fringing seem to be prominent can be detected. Using this information, subsequently acquired image frames may be corrected for color fringing. It is realized that the method may rely on the objects depicted in the digital image frames being stationary, or at least often so. Thus, the applicability of the technique may be different for different applications.

FIG. 1 shows a schematic view of a system 200 for detecting and reducing the effects of color fringing in digital video acquired by a camera 210.

Figure 5:
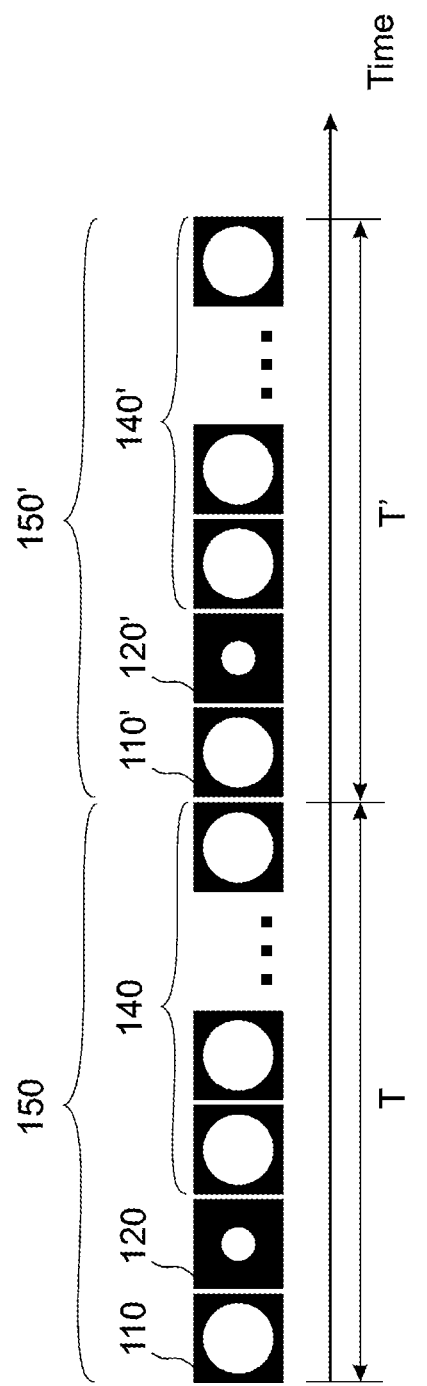
FIG. 5 shows a schematic view of a digital video comprising a sequence of digital image frames according to embodiments of the disclosure.

The system 200 comprises a camera 210 configured to acquire a digital video comprising a sequence 150 of acquired digital image frames. The digital video is schematically illustrated in FIG. 5. The camera 210 comprises an optical system 213 comprising collection optics 216 for collecting light incident on the camera 210. Typically, the collection optics 216 comprises a series of lenses in a lens system. The optical system 213 further comprises an iris 212 which can be controlled so as to allow different iris aperture sizes. The iris 212 may be an integral part of the collection optics 216, such as is often the case for a removable camera lens. The camera 210 further comprises a digital image sensor 214 configured to capture light incident through the connection optics of the camera 210.

The system 200 further comprises an apparatus 220 for controlling the camera 210 and reducing the effects of color fringing in digital video acquired by the camera 210. Specifically, the apparatus 220 is configured to carry out a method for detecting and reducing the effects of color fringing in digital video acquired by a camera 210 according to embodiments disclosed herein. The method will be further discussed later.

The apparatus 220 comprises a communication interface 222 configured to communicate with the camera 210. The apparatus 220 is configured to communicate, to the camera 210, instructions pertaining to the camera 210 acquiring one or more digital image frames. This may include capturing of single digital image frames, i.e. pictures, or a sequence 150 of digital image frames, i.e. a digital video. The apparatus 220 is further configured to communicate, to the camera 210, camera settings including information on the iris aperture size. The apparatus 220 is further configured to receive the acquired digital image frames from the camera 210 and post process them.

The apparatus 220 will now be described in more detail. The apparatus 220 comprises a control unit 226 for controlling the camera 210. Specifically, the control unit 226 is configured to instruct the camera, via the communication interface 222 to start acquiring one or more digital image frames, to stop acquiring digital image frames, to adjust settings for exposure etc. These settings are communicated to the camera 210 using camera settings which include information pertaining to the iris aperture size, the exposure time and the gain of the digital image sensor 214 (ISO number).

The apparatus 220 further comprises a processing unit 224 for processing digital data, such as digital image frames received from the camera 210. Specifically, the processing unit 224 is configured to compare and analyze digital image frames with each other and post process subsequently acquired digital image frames 140 based upon the result of the comparison and analysis.

The apparatus 220 may be included in the camera 210 or may be provided as a separate part which is operatively connected to the camera 220. Alternatively, a first part of the apparatus 220 may be located in the camera 210 and a second part of the apparatus 220 may be located outside of the camera 210, such that some of the method steps disclosed hereinbelow are carried out in the camera 210 and some are carried out outside of the camera 210. As an example, the control unit 226 may be included in the camera 210, whereas the processing unit 224 may be located outside of the camera 210, for example implemented in a computer or further device operatively connected to the camera 120.

Figure 2:
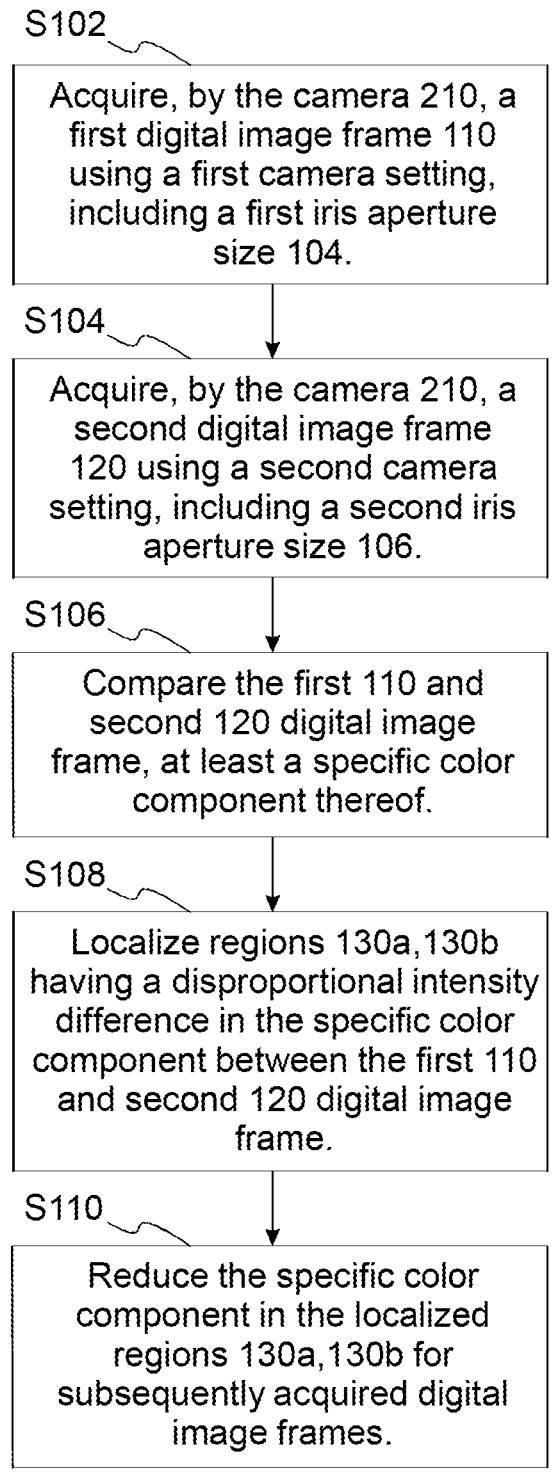
FIG. 2 shows a flow chart of a method according to embodiments of the present disclosure.

The operation of the system 200 will now be disclosed with reference to FIGS. 2-4. In particular, a method detecting and reducing the effects of color fringing in digital video acquired by the camera 210 will be described. The method is here carried out by the system 200 disclosed herein, but it is understood that alternative systems may be configured to carry out the method as defined by the appended claims.

FIG. 2 shows a flow chart of a method for detecting and reducing the effects of color fringing in digital video acquired by a camera 210. The digital video comprises a sequence 150 of acquired digital image frames and may be of any format such as for example AVI, MPEG, etc. As disclosed hereinabove, the camera 210 comprises an iris 212 which may be adjusted to different iris aperture sizes.

The method comprises acquiring S102, by the camera 210, a first digital image frame 110 using a first camera setting, including a first iris aperture size 104. The method further comprises acquiring S104, by the camera 210, a second digital image frame 120 using a second camera setting, including a second iris aperture size 106. The second aperture size 106 is smaller than the first aperture size 104. Thus, the camera settings used for the first 110 and second 120 digital image frame will be different at least in terms of the iris aperture size. Other settings may also be different. For example, the exposure time and/or gain of the digital image sensor 214 may be adjusted such as to allow the first 110 and second 120 digital image frames to have similar level of exposure. The steps of acquiring the first 110 and second 120 digital image frames is initiated by the control unit 226 of the apparatus 220 which is configured to communicate instructions to the camera 210 pertaining to acquire digital image frames. The control unit 226 is further configured to communicate camera settings to the camera 210 such as to allow the camera 210 to acquire images with the correct exposure, including a specific iris aperture size. The first 110 and second 120 digital image frame may now be transferred to the apparatus 220 via the communication interface 222.

The method further comprises comparing S106 the first 110 and the second 120 digital image frames, at least a specific color component thereof. This step is carried out in the processing unit 226. The specific color component may be defined in different ways. Typically, the acquired digital image frames of the sequence 150 of acquired digital image frames are RGB digital image frames comprising a red, green and blue channel. This situation is illustrated in FIG. 3 showing the red, green and blue color channels of the first 110 and second 120 digital image frames, respectively. As illustrated in FIG. 3, color fringing occurs in the example predominately within the blue channel. Thus, for the example, the color fringing may be referred to as blue fringing or, alternatively, purple fringing. Specifically, severe color fringing may be seen in the blue channel 110B of the first digital image frame 110 especially at the border of the circular object. As schematically illustrated in FIG. 3, the color fringing in the blue channel 120B of the second digital image frame 120 is reduced (in FIG. 3, the color fringing has been completely removed in order to increase clarity). In the example of FIG. 3, the specific color component is the digital data stored within the blue channel. However, the specific color component may, alternatively or additionally, comprise data from other channels such as the red channel or even the green channel. For example, a specific color component could be a specific blue, or at least bluish, area within the RGB color space.

The method further comprises localizing S108 regions 130a, 130b having a disproportional intensity ratio in the specific color component between the first digital image frame 110 and the second digital image frame 120. When the iris aperture is varied, the image exposure changes with it. Hence, there will be a change in image intensity between the first 110 and second 120 image. The regions of a digital image frame suffering from a longitudinal chromatic aberration will, due to the reduced iris aperture size, result in a more prominent change in intensity when comparing the first 110 and second 120 digital image frames than the change in intensity found in other regions of the digital image frame not suffering from longitudinal chromatic aberration. Thus, the disproportional intensity ratio will always be larger than a reference intensity ratio. The reference intensity ratio may be regarded as an expected ratio in intensity due to the decreased iris aperture size. In practical situations, the reference intensity ratio must be estimated. One way to estimate the reference intensity ratio is to calculate the ratio in average intensity between the first 110 and second 120 digital image frames. In other words, the disproportional intensity ratio in the specific color component of the localized regions 130a, 130b may be larger than a ratio in average intensity between the first digital image frame 110 and the second digital image frame 120. Another way to estimate the reference intensity ratio is to calculate the ratio in intensity in a reference channel between the first 110 and second 120 digital image frames. Such a reference channel may be selected to be the channel expected to suffer least from color fringing. This is typically the green channel. The reference intensity ratio must not be calculated from the first 110 and second 120 digital image frames. Instead, the reference intensity ratio may be a predetermined value determined from knowledge of the optics and the first 104 and second 106 aperture size.

In the example discussed with reference to FIG. 3, the first 110 and second 120 digital image frames are RGB digital image frames and the step of localizing S108 regions 130a, 130b having a disproportional intensity ratio in the specific color component between the first digital image frame 110 and the second digital image frame 120 comprises determining which pixels within the digital image frames having a ratio between the intensity of the blue channel 110B or the first image frame 110 and the blue channel 120B of the second digital image frame 120 being larger than a reference intensity ratio. In the example, the reference intensity ratio is calculated as the ratio between the average intensity of the green channel 110G of the first digital image frame 110 and the average intensity of the green channel 120G of the second digital image frame 120. This is illustrated in FIG. 4B which shows the intensity of the blue channel 110B of the first digital image frame 110, $I_{1B}$, and the intensity of the blue channel 120B of the second digital image frame 120, $I_{2B}$, along a line L as shown in FIG. 4A. FIG. 4C shows the ratio between the two intensity profiles, i.e. the ratio $I_{1B}/I_{2B}$. As can be seen in FIG. 4B, the intensity profile obtained using the larger iris aperture size, the intensity profile $I_{1B}$, has two maxima which are not seen in the intensity profile obtained using the smaller iris aperture size, the intensity profile $I_{2B}$. The two maxima are a result from excessive color fringing. By determining the ratio between the two intensity profiles, $I_{1B}/I_{2B}$, the relative difference in the profile shape will be extracted. In total absence of color fringing, the ratio $I_{1B}/I_{2B}$ would be expected to be substantially constant along the line L. However, as can be seen in FIG. 4C, the two maxima in $I_{1B}$ will be exposed as two maxima in the ratio $I_{1B}/I_{2B}$. Dependent on the relationship between the first camera setting and the second camera setting, the offset P will vary. This may not be a problem as the maxima is easily traceable by image processing algorithm such as an edge detection algorithm. However, if needed, the information may be calibrated for example by dividing with the corresponding ratio obtained from the green channel. This is shown in FIGS. 4D and E.

The method further comprises reducing S110 the specific color component in the localized regions 130a, 130b for subsequently acquired digital image frames 140. Thus, by using the knowledge on where in the digital image frame color fringing is likely to occur, it may be possible to selectively compensate for color fringing. The compensation may be achieved in different ways.

In an embodiment, the specific color component is reduced by, for pixels present within the localized regions 130a, 130b, replacing existing intensity levels of the red, green and blue channel of each of the subsequently acquired digital image frames 140 to new intensity levels being equal to each other. This implies that the color information in the localized regions is disregarded.

In another embodiment, the specific color component is reduced by, for pixels present within the localized regions 130a, 130b, replacing existing intensity levels of each of the subsequently acquired digital image frames 140 with new intensity levels based upon intensity levels of neighboring pixels. This implies that image analysis of an extended region is needed. The skilled person realizes that there are many methodologies in the art directed towards how to digitally correct a region of a digital image frame. It should thus be understood that many alternative ways exist for achieving said reduction of the specific color component within the scope of the claims.

In yet another embodiment, the color fringing is dominated by blue fringing and the color component is a blue color component. In the embodiment, the blue color component is reduced by, for pixels present within the localized regions 130a, 130b, replacing existing intensity levels of the blue channel of each of the subsequently acquired digital image frames 140 to new intensity levels being a predetermined fraction of the existing intensity levels. The predetermined fraction may be derived for example from the reference ratio. Alternatively, the predetermined fraction may be a value preset by a user.

As illustrated in FIG. 5, the sequence 150 of digital image frames of the digital video may comprise also the first 110 and second 120 digital image frames. Hence, the sequence 150 of acquired digital image frames comprises the first digital image frame 110, the second digital image frame 120 and the subsequently acquired digital image frames 140. This is schematically illustrated in FIG. 5 where each digital image frame is symbolically illustrated using an aperture of varying size. In the example, the first digital image frame 110 and the subsequently acquired digital image frames 140 are acquired using the same camera setting, i.e. the first camera setting. Furthermore, the second camera setting relates to the first camera setting such that the second digital image frame 120 obtains the same exposure as the first digital image frame 110. In the example, this is accomplished by prolonging the exposure time (e.g. the shutter speed) and increasing the gain of the digital image sensor (ISO number) when acquiring the second digital image frame 120. As the gain of the digital image sensor 214 increases the image noise, adjusting the ISO number may be avoided in situations where the imaged scene is more or less stationary. For such scenes, a prolonged exposure time may suffice to achieve the same exposure for the first 110 and second 120 digital image frames.

An advantage of including the first 110 and second 120 digital image frames in the digital video, is that it aids keeping the frame rate constant, thus allowing for a smooth digital video.

The step of reducing the specific color component in the localized regions 130a, 130b may be carried out during a predetermined time period T or for a predetermined number of subsequently acquired digital image frames. Thus, a further pair of first 110' and second 120' digital image frames may be acquired, for example, each 5 minutes. The time period may depend on the scene imaged by the camera 210 as a dynamic scene will increase the need for applying the method at shorter time intervals than a substantially static scene. This is illustrated in FIG. 5 showing a further sequence 150' of digital image frames added after the sequence 150. The further sequence 150' of digital image frames comprises a further pair of first 110' and second 120' digital image frames followed by a further set of subsequently acquired digital image frames 150'. The process may be repeated any number of times. Thus, the digital video may be a continuous stream of digital image frames. As shown in FIG. 5, the process is repeated after a time period T. The time period T' of the further sequence 150' of digital image frames may be adjusted such that the further sequence 150' of digital image frames is updated after a longer, or shorter, time period. Hence, the number of digital image frames within a sequence of digital image frames may vary between sequences of digital image frames within the digital video. Specifically, the time period may be varied dependent on the level of motion in the scene imaged by the camera 210.

The person skilled in the art realizes that the present teachings by no means are limited to the preferred embodiments described above. On the contrary, many modifications and variations are possible within the scope of the appended claims.

For example, more than one digital image frame may be acquired using the first camera setting and more than one digital image frame may be acquired using the second camera setting. In other words, a first set of digital image frames may be compared with a second set of digital image frames, the first and second sets being acquired using different iris aperture size.

Additionally, variations to the disclosed embodiments can be understood and effected by the skilled person in practicing the claims, from a study of the drawings, the disclosure, and the appended claims.

The invention claimed is:

1. A method for detecting and reducing the effects of color fringing in digital video acquired by a camera comprising an iris, said digital video comprising a sequence of acquired RGB digital image frames, each digital image frame comprising image information stored within a red, green and blue channel, said method comprising:
acquiring, by the camera, a first digital image frame using a first camera setting, including a first iris aperture size;
acquiring, by the camera, a second digital image frame using a second camera setting, including a second iris aperture size;
wherein the second aperture size is smaller than the first aperture size;
comparing the first and the second digital image frame, at least one specific color component of said red, green and blue color components thereof,
wherein each of said red, green and blue color components correspond to image information stored within the red, green and blue channels, respectively,
wherein the method further comprises:
localizing regions having a disproportional intensity ratio in the specific color component between the first digital image frame and the second digital image frame; and
reducing the specific color component in the localized regions for subsequently acquired digital image frames.

2. The method according to claim 1, wherein the disproportional intensity ratio in the specific color component of the localized regions is larger than a ratio in average intensity between the first digital image frame and the second digital image frame.

3. The method according to claim 2, wherein the specific color component is reduced by, for pixels present within the localized regions, replacing existing intensity levels of the red, green and blue channel of each of the subsequently acquired digital image frames to new intensity levels being equal to each other.

4. The method according to claim 2, wherein the specific color component is reduced by, for pixels present within the localized regions, replacing existing intensity levels of each of the subsequently acquired digital image frames with new intensity levels based upon intensity levels of neighboring pixels.

5. The method according to claim 2, wherein the specific color component is reduced by, for pixels present within the localized regions, replacing existing intensity levels of each of the subsequently acquired digital image frames with the intensity levels of the second digital image frame.

6. The method according to claim 1, wherein the specific color component is a blue-color component corresponding to image information stored within the blue channel.

7. The method according to claim 6, wherein the blue color component is reduced by, for pixels present within the localized regions, replacing existing intensity levels of the blue channel of each of the subsequently acquired digital image frames to new intensity levels being a predetermined fraction of the existing intensity levels.

8. The method according to claim 1, wherein the second camera setting relates to the first camera setting such that the second digital image frame obtains the same exposure as the first digital image frame.

9. The method according to claim 1, wherein the step of reducing the specific color component in the localized regions is carried out for a predetermined number of subsequently acquired digital image frames.

10. The method according to claim 1, wherein the sequence of acquired digital image frames comprises the first digital image frame, the second digital image frame and the subsequently acquired digital image frames.

11. A non-transitory computer-readable medium comprising computer code instructions which when executed by a device having processing capability are adapted to perform the steps of the method according to claim 1.

12. An apparatus for controlling a camera and reducing the effects of color fringing in digital video acquired by the camera, said digital video comprising a sequence of acquired RGB digital image frames, each digital image frame comprising image information stored within a red, green and blue channel, the apparatus being configured to:
communicate, to the camera, instructions pertaining to the camera acquiring a first digital image frame using a first camera setting, including a first iris aperture size;
communicate, to the camera, instructions pertaining to the camera acquiring a second digital image frame using a second camera setting, including a second iris aperture size,
wherein the second aperture size is smaller than the first aperture size;
receive the first digital image frame and the second digital image frame from the camera;
compare the first and the second digital image frame, at least one specific color component of said red, green and blue color components thereof,
wherein each of said red, green and blue color components correspond to image information stored within the red, green and blue channels, respectively,
wherein the apparatus is further configured to:
localize regions having a disproportional ratio in the specific color component between the first digital image frame and the second digital image frame; and
reduce the color component in the localized regions for subsequently acquired digital image frames.

13. A system for detecting and reducing the effects of color fringing in digital video acquired by a camera, said system comprising:
a camera configured to acquire a digital video comprising a sequence of acquired digital image frames, wherein said camera comprises an iris;
an apparatus according to claim 12.

* * * * *